(12) United States Patent
Lv et al.

(10) Patent No.: US 12,132,567 B2
(45) Date of Patent: Oct. 29, 2024

(54) METHOD, APPARATUS, AND SYSTEM FOR SELECTING CLOCK SOURCE, AND STORAGE MEDIUM

(71) Applicant: Huawei Technologies Co., Ltd., Shenzhen (CN)

(72) Inventors: Jingfei Lv, Wuhan (CN); Dejian Xu, Beijing (CN); Xiaoxia Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 285 days.

(21) Appl. No.: 17/687,056

(22) Filed: Mar. 4, 2022

(65) Prior Publication Data

US 2022/0190945 A1 Jun. 16, 2022

Related U.S. Application Data

(63) Continuation of application No. PCT/CN2020/094411, filed on Jun. 4, 2020.

(30) Foreign Application Priority Data

Sep. 6, 2019 (CN) .......................... 201910844122.1

(51) Int. Cl.
*H04J 3/06* (2006.01)
(52) U.S. Cl.
CPC .................................. *H04J 3/0658* (2013.01)
(58) Field of Classification Search
CPC .................................. H04L 5/14; H04J 3/0658
See application file for complete search history.

(56) References Cited

U.S. PATENT DOCUMENTS

| 7,613,212 | B1* | 11/2009 | Raz ........................ | H04J 3/0641 |
| | | | | 370/510 |
| 7,710,322 | B1* | 5/2010 | Ameti ................... | G01S 5/02213 |
| | | | | 342/465 |
| 8,630,315 | B2* | 1/2014 | Rivaud .................. | H04J 3/0641 |
| | | | | 370/522 |
| 9,106,352 | B2* | 8/2015 | Zheng ................... | H04J 3/0658 |
| 9,698,926 | B2* | 7/2017 | Zampetti ............... | H04J 3/0667 |

(Continued)

FOREIGN PATENT DOCUMENTS

| CN | 101207606 A | 6/2008 |
| CN | 102123024 A | 7/2011 |

(Continued)

OTHER PUBLICATIONS

Editor G.8275.2/Y.1369.2, "Draft Amendment 3 to 6.8275.2 (for consent)," International Telecommunication Union Telecommunication Standardization Sector Study Period 2017-2020, Geneva, Jul. 1-12, 2019, 58 pages.

(Continued)

*Primary Examiner* — Bailor C Hsu
(74) *Attorney, Agent, or Firm* — Conley Rose, P.C.

(57) ABSTRACT

A method includes receiving, by a first node on a first port of the first node, a first packet from a second node; and when the first packet carries a first flag, avoid selecting, by the first node and when selecting a clock source, a clock source corresponding to the first port, where the first flag indicates that time synchronization of the second node is uncertain.

22 Claims, 8 Drawing Sheets

(56) References Cited

U.S. PATENT DOCUMENTS

| | | | |
|---|---|---|---|
| 11,095,383 B2* | 8/2021 | Wang | H04J 3/0673 |
| 2011/0230151 A1* | 9/2011 | Tsai | H04B 1/0475 |
| | | | 455/150.1 |
| 2011/0236031 A1 | 9/2011 | Itou | |
| 2013/0042136 A1* | 2/2013 | Xu | H04W 56/00 |
| | | | 713/400 |
| 2016/0094335 A1 | 3/2016 | Roberts et al. | |
| 2016/0182214 A1 | 6/2016 | Chen | |
| 2016/0197719 A1 | 7/2016 | Wang | |
| 2018/0062780 A1* | 3/2018 | Shimizu | H04N 21/242 |
| 2022/0247505 A1* | 8/2022 | Li | H04W 56/001 |

FOREIGN PATENT DOCUMENTS

| | | |
|---|---|---|
| CN | 102223197 A | 10/2011 |
| CN | 102957488 A | 3/2013 |
| CN | 103051439 A | 4/2013 |
| CN | 103428081 A | 12/2013 |
| CN | 103686982 A | 3/2014 |
| CN | 104426645 A | 3/2015 |
| CN | 105323086 A | 2/2016 |
| CN | 107026702 A | 8/2017 |
| CN | 107078821 A | 8/2017 |
| EP | 2688240 A1 | 1/2014 |
| EP | 2852087 A1 | 3/2015 |
| JP | 2017216563 A | 12/2017 |
| WO | WO-2013152700 A1 * | 10/2013 ............ H04J 3/0641 |
| WO | 2015184763 A1 | 12/2015 |
| WO | 2017101528 A1 | 6/2017 |
| WO | 2017113892 A1 | 7/2017 |
| WO | 2017130034 A1 | 8/2017 |
| WO | 2018104237 A1 | 6/2018 |
| WO | WO-2022127924 A1 * | 6/2022 ............ H04J 3/0658 |

OTHER PUBLICATIONS

Technical Report of "Precision time protocol telecom profile for phase/time synchronization with partial timing support from the network," [online], TR-G8275.2, First edition, The Telecommunication Technology Committee, Mar. 1, 2019, 211 pages total.

"IEEE Standard for a Precision Clock Synchronization Protocol for Networked Measurement and Control Systems, IEEE Instrumentation and Measurement Society," IEEE Std 1588, 2008, 288 pages.

G.8275.2/Y. 1369.2, "Precision time protocol telecom profile for phase/time synchronization with partial timing support from the network, Amendment 1," Nov. 2020, 68 pages.

G.8275.1/Y. 1369.1,"Precision time protocol telecom profile for phase/time synchronization with full timing support from the network, Amendment 3," Aug. 2019, 64 pages.

ITU-T G-series Recommendations, Supplement 68, "Series G: Transmission Systems and Media, Digital Systems and Networks, Synchronization OAM requirements," Feb. 2020, 20 pages.

* cited by examiner

METHOD, APPARATUS, AND SYSTEM FOR SELECTING CLOCK SOURCE, AND STORAGE MEDIUM

CROSS-REFERENCE TO RELATED APPLICATIONS

This is a continuation of International Patent Application No. PCT/CN2020/094411 filed on Jun. 4, 2020, which claims priority to Chinese Patent Application No. 201910844122.1 filed on Sep. 6, 2019. The disclosures of the aforementioned applications are hereby incorporated by reference in their entireties.

TECHNICAL FIELD

This application relates to the field of clock technologies, and in particular, to a method, apparatus, and system for selecting a clock source, and a storage medium.

BACKGROUND

As a distributed system is increasingly used in communication and network applications, clock synchronization becomes increasingly important. As a clock synchronization manner, the Network Time Protocol (NTP) is widely applied. In addition, to meet increasing high-precision time synchronization requirements, the Institute of Electrical and Electronics Engineers (IEEE) 1588 protocol standard is developed to synchronize the most precise clock in the distributed system with other clocks. A full name of the IEEE 1588 protocol standard is the Precision Clock Synchronization Protocol (IEEE 1588 Precision Clock Synchronization Protocol) standard for a network measurement and control system, and is referred to as the Precision Time Protocol (PTP). In both IEEE 1588 and NTP application scenarios, how to select a clock source is the key to maintaining clock synchronization.

SUMMARY

Embodiments of this application provide a method, apparatus, and system for selecting a clock source, and a storage medium, to resolve a problem in a related technology. Technical solutions are as follows.

According to a first aspect, a method for selecting a clock source is provided. The method includes that a first node receives, on a first port of the first node, a first packet sent by a second node. When the first packet carries a first flag, the first node does not select a clock source corresponding to the first port when selecting a clock source. The first flag is used to indicate that time synchronization of the second node is uncertain.

After receiving the first packet that carries the first flag on the first port, when selecting a clock source, the first node does not use clock source data corresponding to the first port to select the clock source, to avoid a time jump of an entire network due to a time jump of a downstream node caused by a fact that time synchronization of an upstream node is uncertain, and ensure normal running of a service.

In an example embodiment, that the first node does not select the clock source corresponding to the first port when selecting the clock source includes that the first node does not use, when selecting the clock source, clock source data received on the first port to select the clock source.

In an example embodiment, that the first node does not use, when selecting the clock source, clock source data received on the first port to select the clock source includes setting a clock source dataset corresponding to the first port to an empty set based on the first flag, and selecting a clock source based on clock source datasets corresponding to ports of the first node. The clock source dataset corresponding to the first port is set as an empty set, so that the clock source data of the first port is not selected during selection of the clock source based on the clock source datasets corresponding to the ports of the first node. This avoids a time jump of the downstream node caused by a fact that time synchronization of the upstream node is uncertain.

In an example embodiment, that the first node does not use, when selecting the clock source, the clock source data received on the first port to select the clock source includes setting a clock source dataset corresponding to the first port to an empty set based on the first flag, and selecting a clock source based on a non-empty clock source dataset in clock source datasets corresponding to ports of the first node. The clock source dataset corresponding to the first port is set as an empty set, so that during selection of a clock source, a clock source is selected based on the non-empty clock source dataset in the clock source datasets corresponding to the ports of the first node, and a clock source dataset that is an empty set does not need to be further screened out. This simplifies a selection process.

In an example embodiment, the setting a clock source dataset corresponding to the first port to an empty set based on the first flag includes setting a value of a signal failure attribute of the first port to a first value based on the first flag, where the first value is used to indicate that a signal failure occurs on the first port, and setting, based on the first value of the signal failure attribute, the clock source dataset corresponding to the first port to an empty set.

In an example embodiment, the signal failure attribute of the first port is a port signal fail attribute (portDS.SF), and the first value of the portDS.SF is true TRUE. The portDS.SF is an attribute defined in an existing standard. Therefore, that the clock source dataset corresponding to the first port is set to an empty set based on the portDS.SF is applicable to the existing standard, and improve applicability of the method provided in this embodiment of this application.

In an example embodiment, the setting a value of a signal failure attribute of the first port to a first value based on the first flag includes determining, based on the first flag, that a packet timing signal fail (PTSF) event occurs on the first port, and setting a value of the portDS.SF of the first port to the first value based on the PTSF event.

In an example embodiment, the PTSF event is a PTSF-loss synchronization (PTSF-lossSync) event, a PTSF-unusable event, or an extended PTSF event. Because the PTSF-lossSync event and the PTSF-unusable event are events defined in the existing standard and are applicable to the existing standard, applicability of the method provided in this embodiment of this application is improved. In addition, the PTSF event is extended by using an extended PTSF event, and a manner of determining the portDS.SF is extended.

In an example embodiment, the first packet is an Announce packet.

In an example embodiment, a synchronization uncertain (synchronizationUncertain) flag in the Announce packet is used to carry the first flag. When a value of the synchronizationUncertain flag is a third value, the first flag is used to indicate that time synchronization of the second node is uncertain.

In an example embodiment, the third value of the synchronizationUncertain flag is TRUE.

According to a second aspect, a method for selecting a clock source is provided. The method includes that a second node generates a first Announce packet. When time synchronization of the second node is uncertain, a level corresponding to a target parameter carried in the first Announce packet is lower than a reference level. The reference level is a level corresponding to the target parameter when the second node performs time synchronization. The second node sends the first Announce packet to a first node. A parameter carried in the first Announce packet is used to select a clock source.

In an implementation, the second node is an intermediate node. Before generating the first announce packet, the second node further receives a second announce packet sent by an upstream node, and correspondingly, generates the first announce packet based on the second announce packet. In this implementation, the target parameter carried in the first announce packet is inferior to a target parameter carried in the second announce packet (that is, a level of the target parameter carried in the second announce packet is used as the reference level).

In another implementation, when the second node is a time server, the target parameter carried in the first announce packet is inferior to a target parameter when the time server is in locked mode (that is, a level of the target parameter when the time server is in locked mode is used as the reference level).

When time synchronization of the upstream second node is uncertain, the first announce packet carries the target parameter whose level is lower than the reference level. In this way, when the downstream first node selects a clock source, because the level of the target parameter in the first announce packet is low, a clock source corresponding to a port on which the first announce packet is received is not selected, to avoid a time jump of an entire network due to a time jump of a downstream node caused by a fact that time synchronization of an upstream node is uncertain, and ensure normal running of a service.

In an example embodiment, the target parameter is one or more of the following parameters: clockClass, clockAccuracy, and offsetScaledLogVariance.

In an example embodiment, that the second node generates the first announce packet includes that the second node receives the second announce packet sent by an upstream node, and modifies the level of the target parameter in the second announce packet to obtain the first announce packet, or generates the first announce packet based on information in the second announce packet.

According to a third aspect, an apparatus for selecting a clock source is provided. The apparatus is used in a first node, and the apparatus includes a receiving module configured to receive, on a first port of the first node, a first packet sent by a second node, and a selection module configured to, when the first packet carries a first flag, do not select, when the first node selects a clock source, a clock source corresponding to the first port, where the first flag is used to indicate that time synchronization of the second node is uncertain.

In an example embodiment, the selection module is configured to do not use, when selecting a clock source, clock source data received on the first port to select the clock source.

In an example embodiment, the selection module is configured to set, based on the first flag, a clock source dataset corresponding to the first port to an empty set, and select a clock source based on clock source datasets corresponding to ports of the first node, or select a clock source based on a non-empty clock source dataset in clock source datasets corresponding to ports of the first node.

In an example embodiment, the selection module is configured to set a value of a signal failure attribute of the first port to a first value based on the first flag, where the first value is used to indicate that a signal failure occurs on the first port, and set, based on the first value of the signal failure attribute, the clock source dataset corresponding to the first port to an empty set.

In an example embodiment, the signal failure attribute of the first port is a portDS.SF, and the first value of the portDS.SF is true TRUE.

In an example embodiment, the selection module is configured to determine, based on the first flag, that a PTSF event occurs on the first port, and set a value of the portDS.SF of the first port to the first value based on the PTSF event.

In an example embodiment, the PTSF event is a PTSF-lossSync event, a PTSF-unusable event, or an extended PTSF event.

In an example embodiment, the first packet is an announce packet.

In an example embodiment, a synchronizationUncertain flag in the announce packet is used to carry the first flag. When a value of the synchronizationUncertain flag is a third value, the first flag is used to indicate that time synchronization of the second node is uncertain.

In an example embodiment, the third value of the synchronizationUncertain flag is TRUE.

According to a fourth aspect, an apparatus for selecting a clock source is provided. The apparatus is used in a second node, and the apparatus includes a generation module configured to, when time synchronization of the second node is uncertain, generate a first announce packet, where a level corresponding to a target parameter carried in the first announce packet is lower than a reference level, and the reference level is a level corresponding to the target parameter when the second node performs time synchronization, and a sending module configured to send the first announce packet to a first node, where a parameter carried in the first announce packet is used to select a clock source.

In an implementation, the second node is an intermediate node, and the generation module is further configured to generate the first announce packet based on a second announce packet received from an upstream node of the second node. In this implementation, the target parameter carried in the first announce packet is inferior to a target parameter carried in the second announce packet (that is, a level of the target parameter carried in the second announce packet is used as the reference level).

In another implementation, when the second node is a time server, the target parameter carried in the first announce packet is inferior to a target parameter when the time server is in locked mode (that is, a level of the target parameter when the time server is in locked mode is used as the reference level).

In an example embodiment, the target parameter is one or more of the following parameters: clockClass, clockAccuracy, and offsetScaledLogVariance.

In an example embodiment, the generation module is configured to receive the second announce packet sent by the upstream node, and modify the level of the target parameter in the second announce packet to obtain the first announce packet, or generate the first announce packet based on information in the second announce packet.

According to a fifth aspect, a system for selecting a clock source is provided. The system includes a first node and a second node. The second node is configured to send a first packet to a first port of the first node. The first node is configured to receive, on the first port of the first node, the first packet sent by the second node. When the first packet carries a first flag, do not select a clock source corresponding to the first port when the first node selects a clock source. The first flag is used to indicate that time synchronization of the second node is uncertain.

In an example embodiment, the first node is configured to do not use, when selecting a clock source, clock source data received on the first port to select the clock source.

In an example embodiment, the first node is configured to set, based on the first flag, a clock source dataset corresponding to the first port to an empty set, and select a clock source based on clock source datasets corresponding to ports of the first node, or select a clock source based on a non-empty clock source dataset in clock source datasets corresponding to ports of the first node.

In an example embodiment, the first node is configured to set a value of a signal failure attribute of the first port to a first value based on the first flag, where the first value is used to indicate that a signal failure occurs on the first port, and set, based on the first value of the signal failure attribute, the clock source dataset corresponding to the first port to an empty set.

In an example embodiment, the signal failure attribute of the first port is a portDS.SF, and the first value of the portDS.SF is true TRUE.

In an example embodiment, the first node is configured to determine, based on the first flag, that a PTSF event occurs on the first port, and set a value of the portDS.SF of the first port to the first value based on the PTSF event.

In an example embodiment, the PTSF event is a PTSF-lossSync event, a PTSF-unusable event, or an extended PTSF event.

In an example embodiment, the first packet is an announce packet.

In an example embodiment, a synchronizationUncertain flag in the announce packet is used to carry the first flag. When a value of the synchronizationUncertain flag is a third value, the first flag is used to indicate that time synchronization of the second node is uncertain.

In an example embodiment, the third value of the synchronizationUncertain flag is TRUE.

According to a sixth aspect, a system for selecting a clock source is provided. The system includes a first node and a second node. The second node is configured to, when time synchronization of the second node is uncertain, generate a first announce packet, where a level corresponding to a target parameter carried in the first announce packet is lower than a reference level, and the reference level is a level corresponding to the target parameter when the second node performs time synchronization, and send the first announce packet to the first node. The first node is configured to receive the first announce packet sent by the second node, where a parameter carried in the first announce packet is used to select a clock source.

In an implementation, the second node is an intermediate node, and is further configured to receive, before generating the first announce packet, a second announce packet sent by an upstream node. Correspondingly, when generating the first announce packet, the second node is further configured to generate the first announce packet based on the second announce packet. In this implementation, the target parameter carried in the first announce packet is inferior to a target parameter carried in the second announce packet (that is, a level of the target parameter carried in the second announce packet is used as the reference level).

In another implementation, when the second node is a time server, the target parameter carried in the first announce packet is inferior to a target parameter when the time server is in locked mode (that is, a level of the target parameter when the time server is in locked mode is used as the reference level).

In an example embodiment, the target parameter is one or more of the following parameters: clockClass, clockAccuracy, and offsetScaledLogVariance.

In an example embodiment, the second node is configured to receive the second announce packet sent by the upstream node, and modify the level of the target parameter in the second announce packet to obtain the first announce packet, or generate the first announce packet based on information in the second announce packet.

A device for selecting a clock source is further provided. The device includes a port and a processor. The port is configured to communicate with another node. The processor is configured to implement any one of the foregoing methods for selecting a clock source. When the device for selecting a clock source is a first node, the port is the foregoing first port.

A computer-readable storage medium is further provided. The storage medium stores at least one instruction, and the instruction is loaded and executed by a processor to implement any one of the foregoing methods for selecting a clock source.

Another communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In an example embodiment, there are one or more processors, and there are one or more memories.

In an example embodiment, the memory may be integrated with the processor, or the memory and the processor are disposed separately.

In a specific implementation process, the memory may be a non-transitory memory, such as a read-only memory (ROM). The memory and the processor may be integrated into one chip, or may be disposed on different chips. A type of the memory and a manner in which the memory and the processor are disposed are not limited in this embodiment of this application.

A computer program (product) is provided. The computer program (product) includes computer program code. When the computer program code is run on a computer, the computer is enabled to perform the methods in the foregoing aspects.

A chip is provided. The chip includes a processor configured to invoke and run instructions stored in a memory, so that a communications device on which the chip is installed performs the methods in the foregoing aspects.

Another chip is provided, including an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

DESCRIPTION OF EMBODIMENTS

Terms used in this application are only used to explain specific embodiments of this application, and are not intended to limit this application.

In an IEEE 1588 or NTP application scenario, when a node on a network restarts due to a power failure or fault rectification or switches a clock source, an output time of the node jumps after the restart or clock source switching. If a downstream node uses the node, as a clock source, for which restart is performed after power failure or fault rectification or clock source selection is performed, an output time of the downstream node also jumps. Consequently, a time jump of the entire network occurs and normal running of a service is affected.

Figure 1:
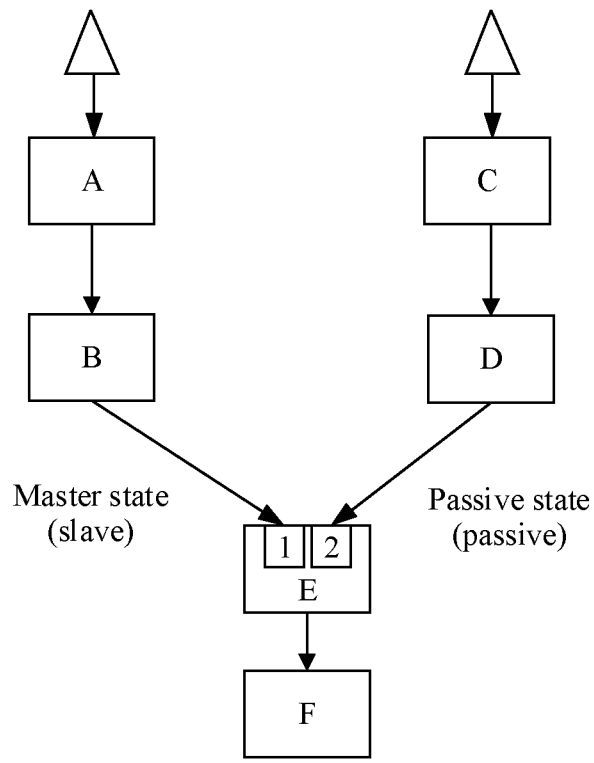
FIG. 1 is a schematic diagram of a 1588 synchronization network scenario according to an embodiment of this application.

An IEEE 1588 synchronization network scenario shown in FIG. 1 is used as an example. The network includes nodes A, B, C, D, E, and F. The node E includes two ports: a port 1 and a port 2. The port 1 corresponds to the node B, and is configured to receive a PTP packet sent by the node B. The port 2 corresponds to the node D, and is configured to receive a PTP packet sent by the node D. In a normal case, both the node A and the node C trace a Global Positioning System (GPS), and values of clock class (clockClass) in announce packets sent by the node A and the node C to the downstream node B and node D are 6. In addition, other parameters in the announce packets that are sent by the node A and the node C, for example, clock accuracy (clockAccuracy) and offset scaled log variance (offsetScaledLogVariance) that represent an IEEE 1588 quality level are the same. Values of clockClass in the announce packets sent by the node B and the node D to the downstream node E are also 6. Other parameters in the announce packets that are sent by the node B and the node D, for example, clockAccuracy and offsetScaledLogVariance that represent the IEEE 1588 quality level are also the same.

A port of each node has four port states, including a master state (master (M)), a slave state (slave (S)), a passive state (passive (P)), and an uncalibrated state. A communications port whose port status is master is referred to as a master port. The master port is used to broadcast a best-quality clock source selected by the node to the entire network. A port in the slave state (or a slave port) and a port in the uncalibrated state are used to trace a clock of an upstream node. When a port is used to trace the clock of the upstream node for time synchronization, a status of the port changes from the slave state to the uncalibrated state or from the uncalibrated state to the slave state based on a status of time synchronization. A passive port is in an intermediate location, and does not broadcast a clock source or trace the clock of the upstream node. If a port is in the passive state, it indicates that there are two or more clock sources with similar quality in an entire PTP network system. As shown in FIG. 1, for example, a port that is corresponding to the node B and that is on the node E is in the slave state, and a port that is corresponding to the node D and that is on the node E is in the passive state. According to the IEEE 1588v2 protocol and the International Telecommunication Union (ITU) Telecommunication Standardization Sector (ITU-T) G.8275.1 protocol, the node E selects, based on a best master clock (BMC) algorithm, the node B or the node D as a clock source to be traced. For example, in FIG. 1, a clockID of the node A is smaller than a clockID of the node C, a primary tracing path of the node E is A→B→E, and a secondary tracing path is C→D→E.

If the node B is powered off, the node E selects the secondary path C→D→E for synchronization. In this way, the node E can ensure that a time output to the node F does not jump. When the node B is powered on again, the node A sends a PTP packet to the node B. Therefore, the node B first synchronizes with the node A, that is, synchronizes with time of the node A based on the PTP packet from the node A. In a process of synchronizing with the time of the node A, time synchronization of the node B is uncertain. That time synchronization of the node is uncertain means that time of the node is greatly adjusted in a synchronization period. A manner of determining that there is a large time adjustment is not limited in this embodiment of this application. For example, the manner includes but is not limited to determining that there is a large time adjustment based on the following three cases. In cases 1, 2A, and 3A, the node is an intermediate node. In cases 2B and 3B, the node is a source node (namely, a time server). The source node refers to a node, for example, the node A or the node C in FIG. 1, that performs time synchronization by directly tracing a satellite signal (for example, a GPS signal). The intermediate node refers to a node, for example, the node B, the node D, the node E, or the node F in FIG. 1, that performs time synchronization by tracing an upstream node. Correspondingly, a clock source signal of the source node is the traced satellite signal, and a clock source signal of the intermediate node is a time signal obtained by tracing the upstream node, and may be generally considered as a time signal of the upstream node.

Case 1: When a node restarts or switches a clock source, an ingress port of the node is in the uncalibrated state, indicating that the node is performing clock synchronization. In this case, time of the node is adjusted greatly. Therefore, in this case, it is determined that time synchronization of the node is uncertain.

In an example embodiment, in this case, it may be considered that time synchronization of the node is certain after reference duration. The reference duration may be set based on experience, or may be set based on an application scenario. The reference duration is not limited in this embodiment of this application.

Case 2 includes case 2A and case 2B.

Case 2A: The node is an intermediate node. The node periodically checks whether a time difference between time of the node and time of a clock source (namely, a time difference between the time of the node and time of an upstream node) is less than a threshold. If the time difference is greater than the threshold, an ingress port of the node is in the uncalibrated state. In this case, time of the node is adjusted greatly. Therefore, it is determined that time synchronization of the node is uncertain.

Case 2B: The node is a source node (namely, a time server). The node periodically checks whether a time difference between time of the node and time of a clock source (namely, a time difference between time of the node and time of a received satellite signal) is less than a threshold. If the time difference is greater than the threshold, it is determined that time synchronization of the node is uncertain.

Case 3 includes case 3A and case 3B.

Case 3A: The node is an intermediate node. After the node restarts or switches a clock source, the node checks whether a time difference between the node and an upstream node is less than a threshold. If the time difference is greater than the threshold, it may be understood that an ingress port of the node is in the uncalibrated state. In this case, time of the node is adjusted greatly. Therefore, it is determined that time synchronization of the node is uncertain.

Case 3B: The node is a source node. After the node restarts or switches a clock source, the node checks whether a time difference between the node and a received satellite signal is less than a threshold. If the time difference is greater than the threshold, it is determined that time synchronization of the node is uncertain.

It may be understood that, in both the foregoing case 2 and case 3, that time synchronization of the node is uncertain is determined by checking whether a time difference between the node and the upstream node is greater than a threshold. For a case in which it is checked that the time difference between the node and the upstream node is less than the threshold, it may be determined that the time of the node is synchronized. In addition, thresholds in cases 2A, 2B, 3A, and 3B may be the same or different. A value of the threshold may be set based on experience, or may be limited based on an application scenario. The value of the threshold is not limited in this embodiment of this application.

Taking FIG. 1 as an example, in a time synchronization process of the node B, time of the node B is adjusted based on the time of the node A (namely, the time carried in the clock source signal). In addition, the node B may further determine whether the time of the node B is synchronized with the time of the node A by determining whether a difference between the time of the node B and time of the node A is less than the threshold. For example, after receiving the PTP packet from the node A, the node B calculates the time difference between the node B and the node A based on the PTP packet from the node A. If the time difference is less than the threshold, it indicates that the time of the node B is synchronized with the time of the clock source signal. In other words, the time of the node B is in a synchronization certain state (the synchronization certain state is referred to as synchronization certain, or synchronization subsequently). If the time difference is not less than the threshold, it indicates that the time of the node B is in a synchronization uncertain state (the synchronization uncertain state is referred to as synchronization uncertain subsequently).

When time synchronization of the node B is uncertain, an output time of the node B jumps. If the node B sends the PTP packet to the node E, the node E selects a clock source corresponding to a port on which the PTP packet is received, so that an output time of the node E also jumps. This situation should be avoided in an IEEE 1588 application. Otherwise, a time jump of the entire network occurs and normal running of a service is affected. The foregoing uses an example of the IEEE1588 scenario for description. For the NTP, during clock synchronization, the following problem also exists an output time of a node jumps, causing a time jump of the entire network and affecting normal running of a service.

Figure 2:
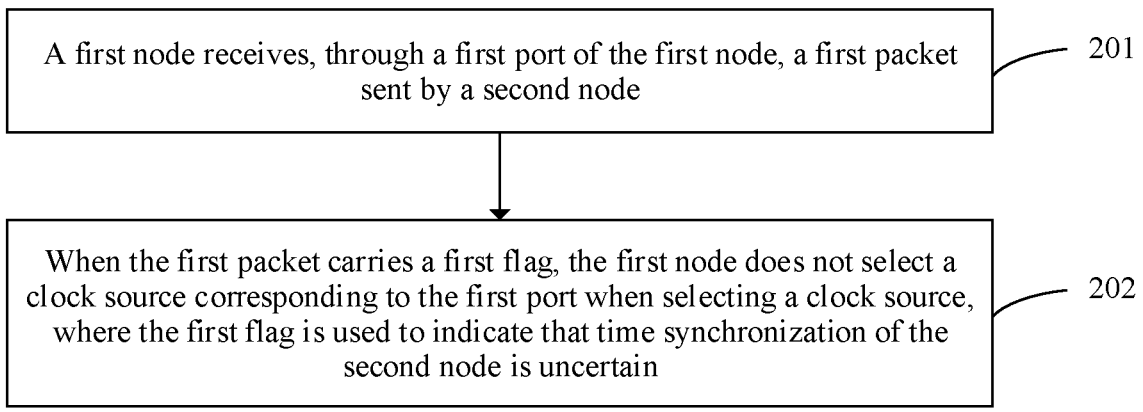
FIG. 2 is a flowchart of a method for selecting a clock source according to an embodiment of this application.

In view of this, an embodiment of this application provides a method for selecting a clock source. In the method, a first flag is carried in a first packet, to notify a downstream node whether time of nodes on a clock source path is synchronized. If the downstream node detects that time synchronization of an upstream clock source is uncertain, the downstream node does not select a clock source corresponding to a port of the upstream node. In this way, an output time of the downstream node is not affected. Next, the method for selecting a clock source provided in this embodiment of this application is described by using an example in which the upstream node is a second node, the downstream node is a first node, and the first node selects a clock source. As shown in FIG. 2, the method includes the following process.

201: The first node receives, on a first port of the first node, the first packet sent by the second node.

The first node is connected to one or more upstream second nodes, and the first node may receive, on the first port of the first node, the first packet sent by the second node, where the first packet includes but is not limited to a PTP packet or an NTP packet. For example, the first packet is a PTP packet of any type. There are five types of PTP packets in IEEE1588v1: a sync packet, a follow_up packet, a delay_req packet, a delay_resp packet, and a management packet. On the basis of version 1, three types of PTP packets in a peer-delay mechanism: a Pdelay_req packet, a Pdelay_resp packet, and a Pdelay_resp_Follow_up packet are added to version 2. In addition, a signaling packet and an announce packet are added.

The packets such as sync, delay_req, follow_up, and delay_resp are used for synchronization of time information of an ordinary clock and a boundary clock through a response mechanism (delay request-response mechanism). The Pdelay_req, Pdelay_resp, and Pdelay_resp_Follow_up packets are used to measure a link delay between two clock ports through the peer delay mechanism. The announce packet is used to establish a synchronization path and send a status and feature information of a root node and a node that sends the announce packet. The management packet is used to query and update a PTP dataset maintained by a clock. The signaling packet is used for other purposes, for example, to adjust a frequency of sending a unicast packet between a master node and a slave node. In the method provided in this embodiment of this application, the first node may receive, on the first port, any one of the foregoing first packets sent by the second node to the first node.

In an example embodiment, if the second node restarts due to power failure or fault rectification, and time of the second node is not synchronized with time of an upstream node of the second node, the first flag may be carried in the first packet to notify the downstream node that time synchronization of the upstream second node is uncertain. In the method provided in this embodiment of this application, the first flag may be carried in an existing field of the first packet, or may be carried in a newly defined field of the first packet. A manner of carrying the first flag in the first packet is not limited in this embodiment of this application.

For example, the first packet sent by the second node to the first port of the first node is an announce packet. If time synchronization of the second node is uncertain, the announce packet sent by the second node to the first node carries the first flag, and the first flag is used to indicate that time synchronization of the second node is uncertain. In an example embodiment, the first flag may be carried in an existing field of the announce packet, or may be carried in a newly added field of the announce packet. For example, the first flag is carried in the existing field of the announce packet, and the first flag may be carried in a synchronizationUncertain flag in the announce packet. For example, when a value of the synchronizationUncertain flag is TRUE, the first flag is used to indicate that time synchronization of the second node is uncertain. Alternatively, the value of the synchronizationUncertain flag may be another value other than TRUE and FALSE. The value of the synchronizationUncertain flag that is used to indicate that time synchronization of the second node is uncertain is not limited in this embodiment of this application. In addition, regardless of a representation form of the value of the synchronizationUncertain flag that is used to indicate that time synchronization of the second node is uncertain, the announce packet sent by the second node carries the first flag, and further carries other parameters such as clockClass, clockAccuracy, and offsetScaledLogVariance.

In addition to the manner of carrying the first flag in the synchronizationUncertain in the announce packet, the method provided in this embodiment of this application further supports carrying the first flag in another parameter in the announce packet when time synchronization of the second node is uncertain. For example, when the second node determines that time synchronization is uncertain, the second node sets a value, to a specific value, of one or more parameters such as clockClass, clockAccuracy, and offsetScaledLogVariance in the to-be-sent announce packet. The specific value indicates that time synchronization of the second node is uncertain. The network shown in FIG. 1 is used as an example. In a normal case, after a node A and a node C trace a GPS, values of clockClass in announce packets sent by the node A and the node C to a downstream node B and node D are 6. When the second node determines that time synchronization of the second node is uncertain, the second node sets the clockClass in the announce packet to 187 or 248, and then sends the announce packet to the first node. The clockClass is set to the specific value 187 or 248 to indicate that time synchronization of the second node is uncertain, so that the first node does not select the second node as the clock source.

It should be noted that a manner for carrying the first flag is not limited in this embodiment of this application. According to the IEEE 1588v2 standard, after a node in a slave port state selects a clock source, the node sends clockClass, received by a slave port, in an announce packet on a master port without degrading the clockClass. Therefore, if the existing IEEE 1588v2 standard is not changed, the foregoing manner of carrying the first flag in the synchronizationUncertain in the announce packet may be used.

202: When the first packet carries the first flag, the first node does not select a clock source corresponding to the first port when selecting a clock source, where the first flag is used to indicate that time synchronization of the second node is uncertain.

After the first node receives the first packet sent by the second node, the first node parses the first packet. If it can be learned through parsing that the first packet carries the first flag, it may be determined that time synchronization of the second node is uncertain, and the clock source corresponding to the first port is not selected during selection of the clock source. For example, a manner in which the first node does not select the clock source corresponding to the first port when selecting the clock source includes but is not limited to that the first node does not use, when selecting the clock source, clock source data received on the first port to select the clock source. The first node receives the first packet on the first port. When selecting the clock source, the first node does not use the clock source data received on the first port to select the clock source, and therefore does not select the clock source corresponding to the first port. This avoids a time jump.

In an example embodiment, after the first port of the first node receives the first packet that carries the first flag, because the first flag indicates that time synchronization of the second node is uncertain, the first node may record a time synchronization uncertain state of the second node. For example, the first node records a case in which the first packet that carries the first flag is received on the first port, so that when the first node selects the clock source, the first node does not use, based on the recorded time synchronization uncertain state of the second node, the clock source data received on the first port, and therefore does not select the clock source corresponding to the first port when selecting the clock source.

In addition to the foregoing manner of recording a port corresponding to the first flag, each port of the first node has a clock source dataset. For example, the first packet is an announce packet. In addition to the first flag, the first packet further carries clock source data such as clockClass and clockID. The clock source dataset includes the clock source data such as the clockClass and the clockID in the announce packet. Therefore, when time synchronization of the second node is uncertain, when selecting the clock source, the first node does not use the clock source data received on the first port to select the clock source, which may further include but is not limited to the following two manners:

Manner 1: When selecting the clock source, the first node sets, based on the first flag, a clock source dataset corresponding to the first port to an empty set, and selects the clock source based on clock source datasets corresponding to ports of the first node.

In Manner 1, the first packet carries the first flag, and the first flag indicates that time synchronization of the second node is uncertain. Therefore, when selecting the clock source, the first node sets, based on the first flag, the clock source dataset corresponding to the first port to an empty set, and then selects the clock source based on the clock source datasets corresponding to the ports of the first node. The clock source datasets corresponding to the ports of the first node includes the clock source dataset corresponding to the first port. In other words, when selecting the clock source, the first node may obtain the clock source datasets corresponding to all the ports of the first node, then compare clock source data in all the clock source datasets, and selects the clock source. Because the clock source dataset corresponding to the first port is an empty set, the clock source data received on the first port is not used to select the clock source. For example, for the manning of selecting the clock source, refer to a BMC source selection process defined in ITU-T G.8275.1 and G.8275.2 released in March 2018.

Manner 2: When selecting the clock source, the first node sets, based on the first flag, the clock source dataset corresponding to the first port to an empty set, and selects the clock source based on clock source data in a non-empty clock source dataset in the clock source datasets corresponding to the ports of the first node.

In Manner 2, similarly, the first packet carries the first flag, and the first flag indicates that time synchronization of the second node is uncertain. Therefore, when selecting the clock source, the first node sets, based on the first flag, the clock source dataset corresponding to the first port to an empty set. Different from Manner 1, in Manner 2, after setting the clock source dataset corresponding to the first port to an empty set, the first node does not select the clock source based on the clock source datasets corresponding to all the ports of the first node, but obtains only the non-empty clock source dataset and selects the clock source based on the non-empty clock source dataset. In other words, in Manner 2, the first node compares clock source data in non-empty clock source datasets, to select the clock source.

In an example embodiment, in either the foregoing Manner 1 or Manner 2, a manner in which the first node sets, based on the first flag, the clock source dataset corresponding to the first port to an empty set when selecting the clock source includes but is not limited to the following manner. When selecting the clock source, the first node sets a value of a signal failure attribute of the first port to a first value based on the first flag, where the first value is used to indicate that a signal failure occurs on the first port, and sets, based on the first value of the signal failure attribute, the clock source dataset corresponding to the first port to an empty set.

For example, a signal fail attribute portDS.SF is currently defined in ITU-T G.8275.2. If a value of portDS.SF of the first port is the first value, for example, TRUE, the first node sets the clock source dataset (Erbest) corresponding to the first port to an empty set. Therefore, in the method provided in this embodiment of this application, a signal fail attribute portDS.SF of a port may be used as the signal failure attribute. If the first value of the portDS.SF of the first port is TRUE, the clock source dataset (Erbest) of the first port is set to an empty set.

The value of the portDS.SF of the first port may be determined by using a PTSF event. For example, setting the value of the signal failure attribute of the first port to the first value based on the first flag includes determining, based on the first flag, that the PTSF event occurs on the first port, and setting the value of the portDS.SF of the first port to the first value based on the PTSF event. A default value of the PTSF event may be FALSE, indicating that no PTSF event occurs. After the PTSF event occurs, the value of the PTSF event may be set to TRUE. When the value of the PTSF event is TRUE, the value of the portDS.SF of the first port is set to the first value.

For example, in ITU-T G.8275.2, the portDS.SF attribute is determined based on a PTSF-lossSync event and a PTSF-unusable event. If the port fails to receive the PTP packet, it is determined that the PTSF-lossSync event occurs, and a value of the PTSF-lossSync event is set to a second value (for example, the second value is TRUE). Otherwise, the value of the PTSF-lossSync event is FALSE. If performance of the PTP packet received by the port exceeds a tolerance range of the node, it is determined that the PTSF-unusable event occurs, and the value of the PTSF-unusable event is set to the second value (for example, the second value is TRUE). Otherwise, the value of the PTSF-unusable event is FALSE. If the PTSF-lossSync event or the PTSF-unusable event occurs, the value of the portDS.SF is TRUE. In the method provided in this embodiment of this application, it may be determined, based on the first flag, that the PTSF-lossSync event or the PTSF-unusable event occurs, and the value of the portDS.SF is the first value (for example, TRUE). In addition, the method provided in this embodiment of this application further supports extension of a new PTSF event to trigger setting of the value of the portDS.SF attribute of the first port to the first value. For example, the synchronizationUncertain in the received announce packet corresponds to a new extended PTSF event. For example, the extended PTSF event is named as a PTSF-syncuncertain (PTSF-syncUncertain) event, used to indicate that a signal failure occurs on the first port because time synchronization of the upstream node is uncertain. When a value of the synchronizationUncertain in the received announce packet is TRUE, it is determined that the PTSF-syncUncertain event occurs. In this case, a value of the PTSF-syncUncertain event is set to the second value (for example, TRUE), and the value of the portDS.SF is set to the first value.

In conclusion, if the PTSF-lossSync event, the PTSF-unusable event, or the extended PTSF event (for example, PTSF-syncUncertain) occurs, the value of portDS.SF is TRUE, and the Erbest of the first port is set to an empty set, so that when selecting the clock source, the first node does not use the clock source data corresponding to the first port. Therefore, that the value of the signal failure attribute of the first port is set to the first value based on the first flag includes but is not limited to the following manners.

Manner 1: That the extended PTSF event is the PTSF-syncUncertain event is used as an example. It is determined, based on the first flag, that the PTSF-syncUncertain event occurs on the first port, and is used to indicate that a signal failure event occurs on the first port because time synchronization of the upstream node is uncertain. In addition, the value of the portDS.SF of the first port is set to the first value based on the PTSF-syncUncertain event.

For example, when the PTSF-syncUncertain event occurs, the value of the PTSF-syncUncertain event is set to the second value. For example, the second value is TRUE. In other words, when the PTSF-syncUncertain event occurs, it indicates that the signal failure event occurs on the first port because time synchronization of the upstream node is uncertain, and therefore setting the value of the portDS.SF of the first port to the first value is triggered. For example, the value of the portDS.SF is set to TRUE, and setting the clock source dataset corresponding to the first port to an empty set is triggered. In addition, when the PTSF-syncUncertain event occurs, the second value of the PTSF-syncUncertain event may also be set to FALSE. In other words, when the PTSF-syncUncertain event occurs, the value of the PTSF-syncUncertain event is FALSE, indicating that the signal failure event occurs on the first port because time synchronization of the upstream node is uncertain. Therefore, setting the value of the portDS.SF of the first port to the first value is triggered. For example, the value of the portDS.SF is TRUE, and this triggers setting the clock source dataset corresponding to the first port to an empty set. Alternatively, the second value of the PTSF-syncUncertain event may be represented in another form other than TRUE and FALSE. This is not limited in this embodiment of this application.

Manner 2: It is determined, based on the first flag, that the PTSF-lossSync event occurs on the first port, and the value of the portDS.SF of the first port is set to the first value based on the PTSF-lossSync event.

For example, when the PTSF-lossSync event occurs, the value of the PTSF-lossSync event is set to the second value. The second value is TRUE. In other words, when the value of the PTSF-lossSync event is TRUE, it indicates that the signal failure event occurs on the first port because time synchronization of the upstream node is uncertain, and therefore setting the value of the portDS.SF of the first port to the first value is triggered. For example, the value of the portDS.SF is set to TRUE, and setting the clock source dataset corresponding to the first port to an empty set is triggered. Alternatively, the second value of the PTSF-lossSync event may be represented in another form other than TRUE. This is not limited in this embodiment of this application.

Manner 3: It is determined, based on the first flag, that the PTSF-unusable event occurs on the first port, and the value of the portDS.SF of the first port is set to the first value based on the PTSF-unusable event.

For example, when the PTSF-unusable event occurs, the value of the PTSF-unusable event is set to the second value. For example, the second value is TRUE. In other words, when the value of the PT SF-unusable event is TRUE, it indicates that the signal failure event occurs on the first port because time synchronization of the upstream node is uncertain, and therefore setting the value of the portDS.SF of the first port to the first value is triggered. For example, the value of the portDS.SF is set to TRUE, and setting the clock source dataset corresponding to the first port to an empty set is triggered. Alternatively, the second value of the PTSF-unusable event may be represented in another form other than TRUE. This is not limited in this embodiment of this application.

According to the method provided in this embodiment of this application, when time synchronization of the upstream second node is uncertain, the first flag is carried in the first packet, to indicate that time synchronization of the second node is uncertain. In this way, after receiving the first packet that carries the first flag on the first port, when selecting the clock source, the downstream first node does not use the clock source data corresponding to the first port to select the clock source, to avoid a time jump of an entire network due to a time jump of the downstream node caused by a fact that time synchronization of the upstream node is uncertain, and ensure normal running of a service.

Figure 3:
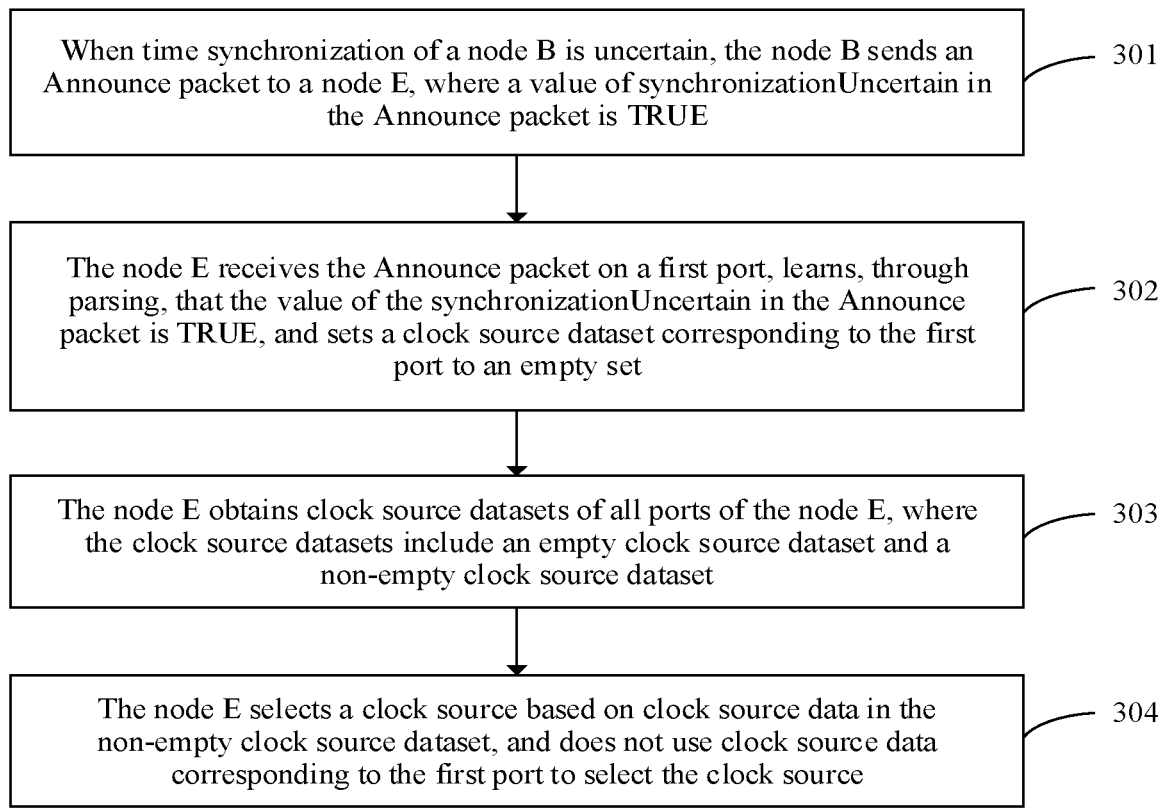
FIG. 3 is a flowchart of a method for selecting a clock source according to an embodiment of this application.

Next, the network shown in FIG. 1 is used as an example to describe several possible implementations of the method provided in the embodiments of this application. The node E in FIG. 1 is a first node, the node B is a second node, and a first packet is an announce packet. As shown in FIG. 3, the method for selecting a clock source includes the following steps.

301: When time synchronization of the node B is uncertain, the node B sends an announce packet to the node E, where a value of synchronizationUncertain in the announce packet is TRUE.

302: The node E receives the announce packet on a first port, learns, through parsing, that the value of the synchronizationUncertain in the announce packet is TRUE, and sets a clock source dataset corresponding to the first port to an empty set.

303: The node E obtains clock source datasets of all ports of the node E, where the clock source datasets include an empty clock source dataset and a non-empty clock source dataset.

304: The node E selects a clock source based on clock source data in the non-empty clock source dataset, and does not use clock source data corresponding to the first port to select the clock source.

For a process of selecting the clock source by the node E, refer to a BMC source selection process defined in ITU-T G.8275.1 and G.8275.2 released in March 2018.

Figure 4:
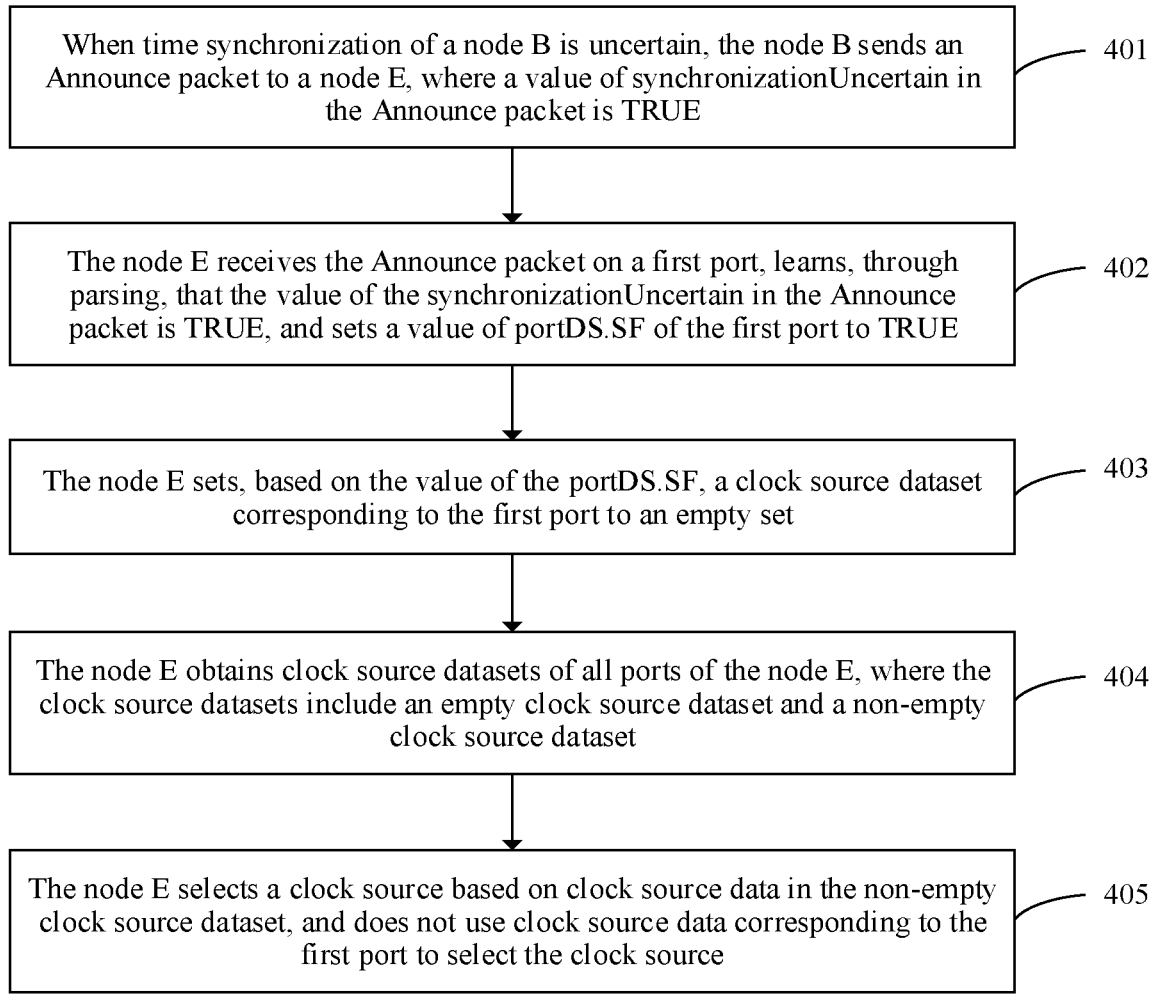
FIG. 4 is a flowchart of a method for selecting a clock source according to an embodiment of this application.

The network shown in FIG. 1 is still used as an example to describe the method provided in the embodiments of this application. The node E in FIG. 1 is a first node, the node B is a second node, and a first packet is an announce packet. As shown in FIG. 4, the method for selecting a clock source includes the following steps.

401: When time synchronization of the node B is uncertain, the node B sends an announce packet to the node E, where a value of synchronizationUncertain in the announce packet is TRUE.

402: The node E receives the announce packet on a first port, learns, through parsing, that the value of the synchronizationUncertain in the announce packet is TRUE, and sets a value of portDS.SF of the first port to TRUE.

403: The node E sets, based on the value of the portDS.SF, a clock source dataset corresponding to the first port to an empty set.

404: The node E obtains clock source datasets of all ports of the node E, where the clock source datasets include an empty clock source dataset and a non-empty clock source dataset.

405: The node E selects a clock source based on clock source data in the non-empty clock source dataset, and does not use clock source data corresponding to the first port to select the clock source.

For a process of selecting the clock source by the node E, refer to a BMC source selection process defined in ITU-T G.8275.1 and G.8275.2 released in March 2018.

Figure 5:
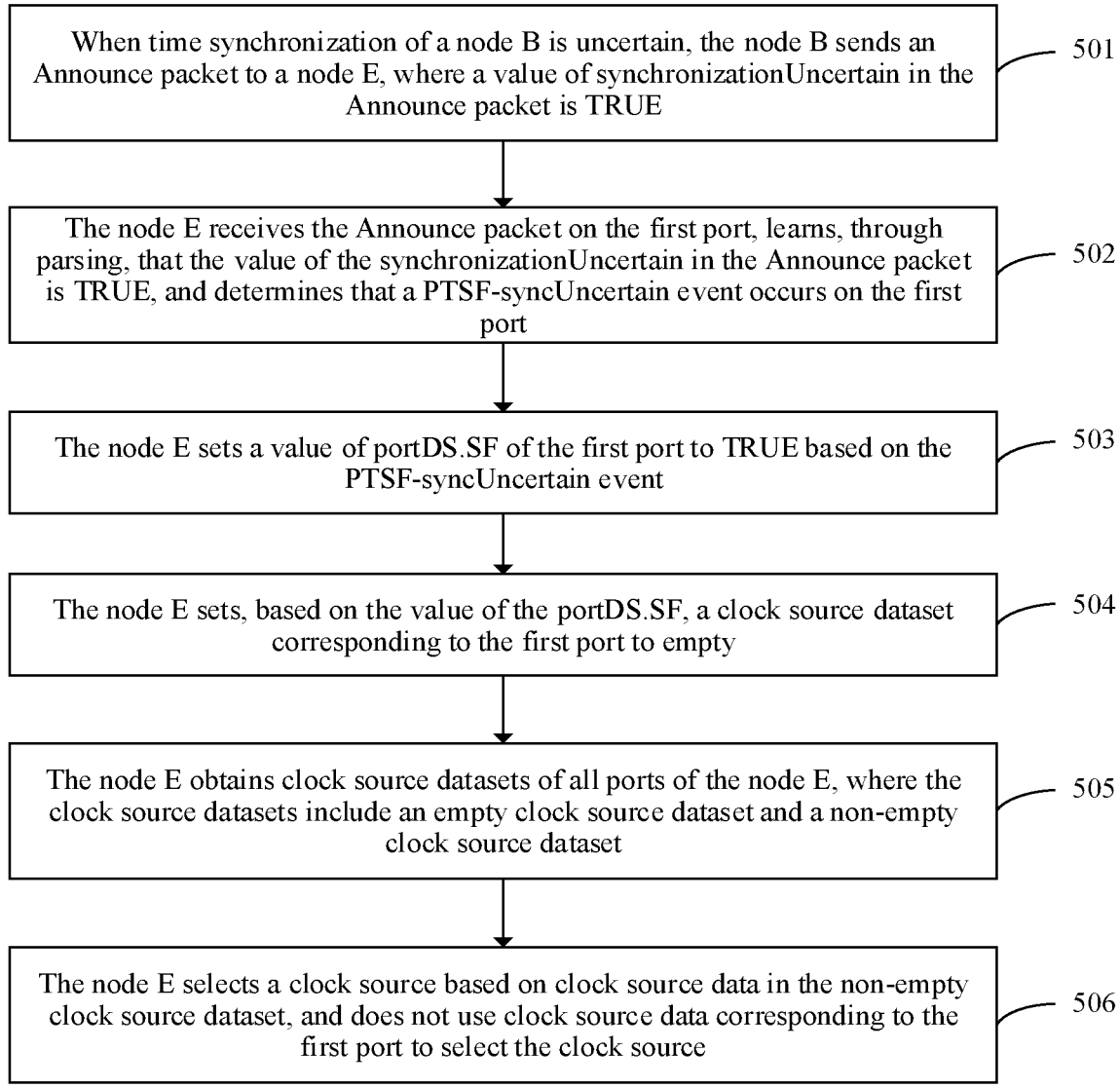
FIG. 5 is a flowchart of a method for selecting a clock source according to an embodiment of this application.

The network shown in FIG. 1 is still used as an example to describe the method provided in the embodiments of this application. The node E in FIG. 1 is a first node, the node B is a second node, and a first packet is an announce packet. As shown in FIG. 5, the method for selecting a clock source includes the following steps.

501: When time synchronization of the node B is uncertain, the node B sends an announce packet to the node E, where a value of synchronizationUncertain in the announce packet is TRUE.

502: The node E receives the announce packet on the first port, learns, through parsing, that the value of the synchronizationUncertain in the announce packet is TRUE, and determines that a PTSF-syncUncertain event occurs on the first port.

503: The node E sets a value of portDS.SF of the first port to TRUE based on the PT SF-syncUncertain event.

504: The node E sets, based on the value of the portDS.SF, a clock source dataset corresponding to the first port to empty.

505: The node E obtains clock source datasets of all ports of the node E, where the clock source datasets include an empty clock source dataset and a non-empty clock source dataset.

506: The node E selects a clock source based on clock source data in the non-empty clock source dataset, and does not use clock source data corresponding to the first port to select the clock source.

For a process of selecting the clock source by the node E, refer to a BMC source selection process defined in ITU-T G.8275.1 and G.8275.2 released in March 2018.

Figure 6:
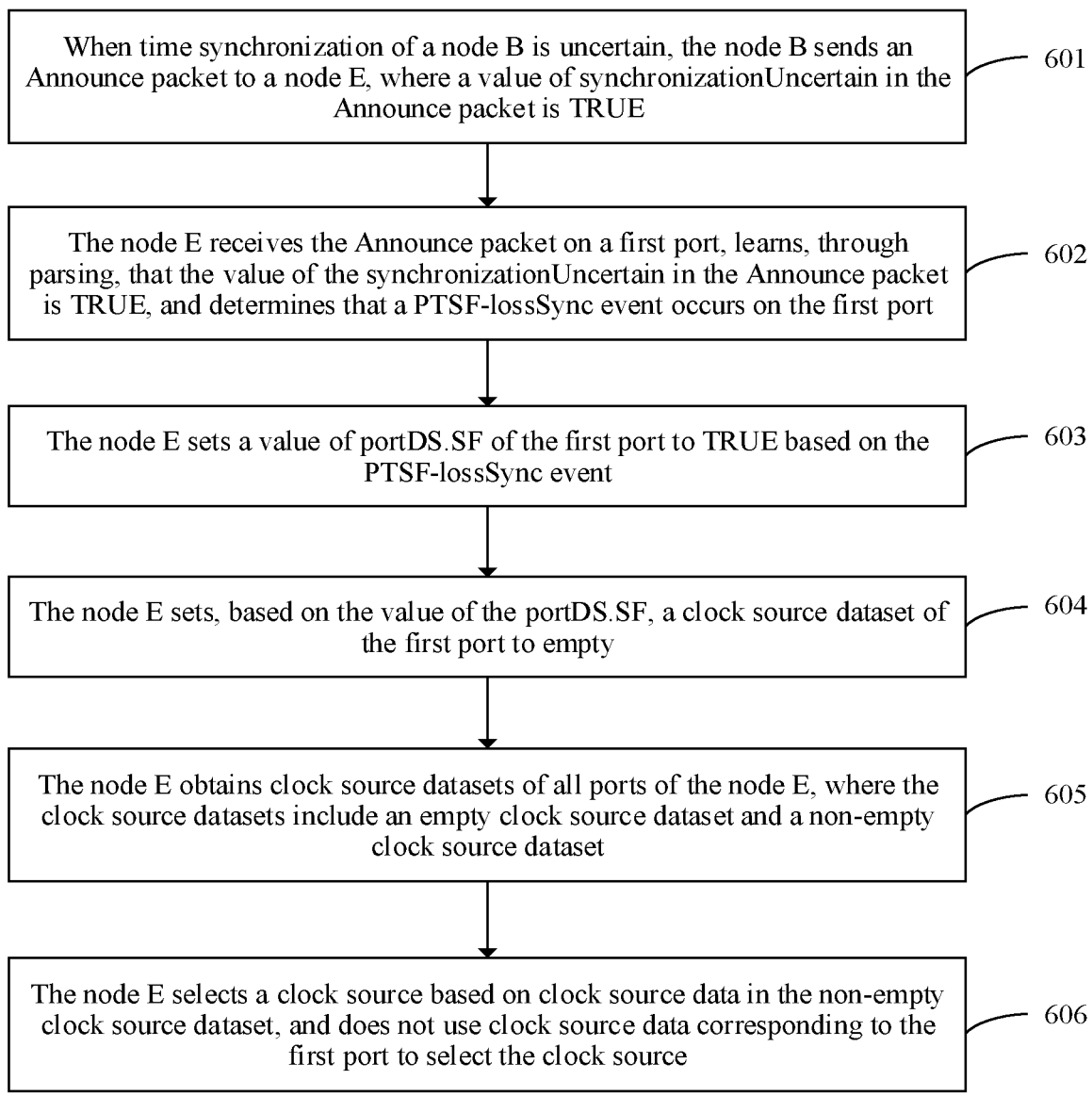
FIG. 6 is a flowchart of a method for selecting a clock source according to an embodiment of this application.

The network shown in FIG. 1 is still used as an example to describe the method provided in the embodiments of this application. The node E in FIG. 1 is a first node, the node B is a second node, and a first packet is an announce packet. As shown in FIG. 6, the method for selecting a clock source includes the following steps.

601: When time synchronization of the node B is uncertain, the node B sends an announce packet to the node E, where a value of synchronizationUncertain in the announce packet is TRUE.

602: The node E receives the announce packet on a first port, learns, through parsing, that the value of the synchronizationUncertain in the announce packet is TRUE, and determines that a PTSF-lossSync event occurs on the first port.

603: The node E sets a value of portDS.SF of the first port to TRUE based on the PTSF-lossSync event.

604: The node E sets a clock source dataset of the first port to empty based on the value of the portDS.SF.

605: The node E obtains clock source datasets of all ports of the node E, where the clock source datasets include an empty clock source dataset and a non-empty clock source dataset.

606: The node E selects a clock source based on clock source data in the non-empty clock source dataset, and does not use clock source data corresponding to the first port to select the clock source.

For a process of selecting the clock source by the node E, refer to a BMC source selection process defined in ITU-T G.8275.1 and G.8275.2 released in March 2018.

Figure 7:
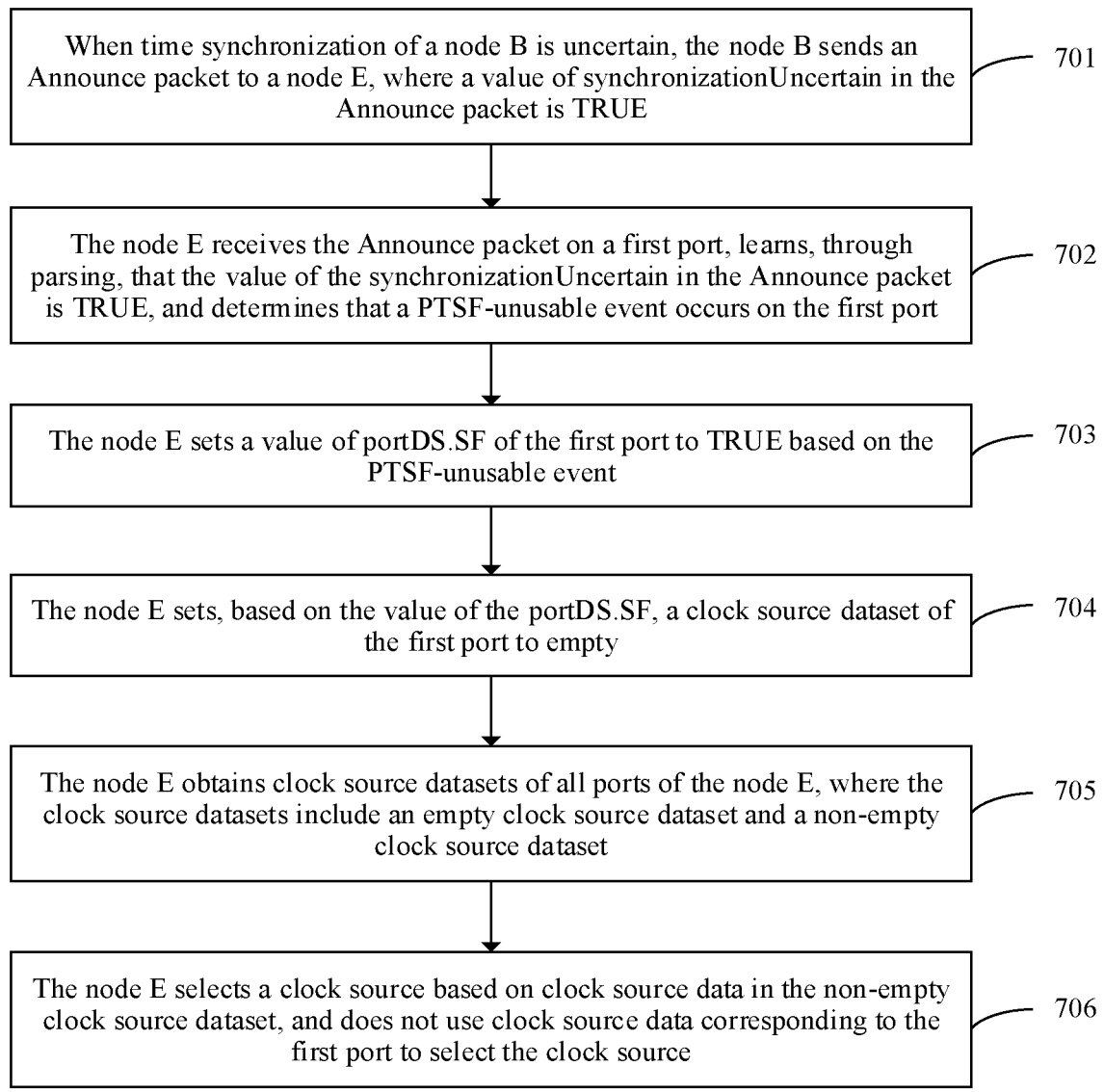
FIG. 7 is a flowchart of a method for selecting a clock source according to an embodiment of this application.

The network shown in FIG. 1 is still used as an example to describe the method provided in the embodiments of this application. The node E in FIG. 1 is a first node, the node B is a second node, and a first packet is an announce packet. As shown in FIG. 7, the method for selecting a clock source includes the following steps.

701: When time synchronization of the node B is uncertain, the node B sends an announce packet to the node E, where a value of synchronizationUncertain in the announce packet is TRUE.

702: The node E receives the announce packet on a first port, learns, through parsing, that the value of the synchronizationUncertain in the announce packet is TRUE, and determines that a PTSF-unusable event occurs on the first port.

703: The node E sets a value of portDS.SF of the first port to TRUE based on the PTSF-unusable event.

704: The node E sets a clock source dataset of the first port to empty based on the value of the portDS.SF.

705: The node E obtains clock source datasets of all ports of the node E, where the clock source datasets include an empty clock source dataset and a non-empty clock source dataset.

706: The node E selects a clock source based on clock source data in the non-empty clock source dataset, and does not use clock source data corresponding to the first port to select the clock source.

For a process of selecting the clock source by the node E, refer to a BMC source selection process defined in ITU-T G.8275.1 and G.8275.2 released in March 2018.

It should be noted that, in the embodiments shown in FIG. 2 to FIG. 7, the following example is merely used for description. When time synchronization of the second node is uncertain, after the first node receives, on the first port of the first node, the first packet that is sent by the second node and that carries a first flag, the first node does not select a clock source corresponding to the first port, and therefore a time jump is avoided. If time of the second node is synchronized subsequently, a second packet is sent to the first node. The second packet may carry a second flag, and the second flag is used to indicate time synchronization of the second node. After receiving the second packet that carries the second flag, the first node may not set a clock source dataset, on the first port, corresponding to a port of the second node as an empty set, so that the clock source corresponding to the first port is used as a selection object to select a clock source. For example, still using the network shown in FIG. 1 as an example, after time of the node B is synchronized, a value of the synchronizationUncertain flag in the announce packet sent by the node B on a master port is FALSE. In other words, the second flag is carried through the value of the synchronizationUncertain. In this way, a downstream node is notified that the time of the node B is synchronized. The node E selects, based on a BMC algorithm, the node B or a node D as a clock source to be traced. After receiving the announce packet from the node B on a port 1, the downstream node E learns, through parsing, that the value of the synchronizationUncertain in the announce packet of the node B is FALSE. In this case, the node E sets an Erbest dataset of the port 1 to announce packet information of the node B. Still taking that a clockID of a node A in FIG. 1 is less than a clockID of a node C as an example, the node E reselects the port 1 to trace the node B.

In an example embodiment, in addition to the foregoing manner in which the first flag is used to indicate that time synchronization of the second node is uncertain, so that the downstream first node does not select the clock source corresponding to the first port on which the first packet is received from the second node, the method provided in this embodiment of this application further supports a parameter degradation manner, to prevent the clock source of the first port from selecting, thereby avoiding a time jump of the first node. A specific implementation includes Implementation A and Implementation B in the following method.

Figure 8:
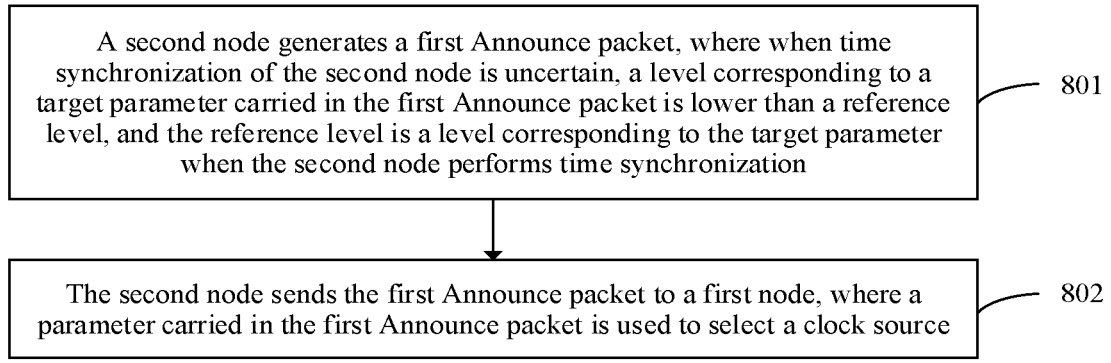
FIG. 8 is a flowchart of a method for selecting a clock source according to an embodiment of this application.

As shown in FIG. 8, the method for selecting a clock source provided in this embodiment of this application includes the following steps.

801: A second node generates a first announce packet, where the first announce packet includes a target parameter.

The target parameter in the first announce packet includes at least one of a first target parameter and a second target parameter.

The first target parameter is used to represent a master clock priority, for example, grandmasterPriority1 and grandmasterPriority2 in the PTP.

The second target parameter is used to represent master clock quality, for example, grandmasterClockQuality in the PTP, and may further include at least one of the following quality parameters:

A parameter used to represent international atomic time TAI traceability of a clock, for example, clock class (clockClass) defined in the PTP;

A parameter used to represent clock accuracy, for example, clock accuracy (clockAccuracy) defined in the PTP; and A parameter used to represent clock stability, for example, offset scaled log variance (offsetScaledLogVariance).

The second node may be an intermediate node, or may be a source node. When the second node is an intermediate node, before step 801, the second node further receives a second announce packet sent by an upstream node, and generates, in step 801, the first announce packet based on the second announce packet.

As described above, time of the second node may be in a synchronization certain state, or may be in a synchronization uncertain state. According to this embodiment of this application, when the time of the second node is in the synchronization uncertain state, the target parameter carried in the first announce packet is an inferior parameter, and when the time of the second node is in the synchronization certain state, the target parameter carried in the first announce packet is a preferable parameter.

In Implementation A, when time synchronization of the second node is uncertain (that is, the second node is in the synchronization uncertain state), a level corresponding to the target parameter carried in the first announce packet is lower than a reference level. The reference level is a level corresponding to the target parameter when the second node performs time synchronization (that is, in the synchronization certain state). During specific implementation, the target parameter in the first announce packet may be set to a preset value, and a level corresponding to the preset value is lower than the reference level. For example, the target parameter includes the clockClass and the clockAccuracy, a preset value corresponding to the clockClass is 248, and a preset value corresponding to the clockAccuracy is unknown. In addition, when time of the second node is synchronized, the level corresponding to the target parameter carried in the first announce packet is the reference level.

When the second node is an intermediate node, a level of a target parameter carried in the second announce packet may be used as the reference level. Correspondingly, the target parameter carried in the first announce packet is inferior to the target parameter carried in the second announce packet. For example, a value of clockClass carried in the second announce packet is 6, and a value of the clockClass carried in the first announce packet is a value greater than 6, for example, 187 or 248. It should be noted that, when the target parameters include more than one parameter, that the target parameter carried in the first announce packet is inferior to the target parameter carried in the second announce packet means that all parameters in the target parameters carried in the first announce packet are inferior to corresponding parameters in target parameters carried in the second announce packet. For example, if the target parameter includes the clockClass and the clockAccuracy, the clockClass carried in the first announce packet is inferior to the clockClass carried in the second announce packet, and the clockAccuracy carried in the first announce packet is inferior to the clockAccuracy carried in the second announce packet.

When the second node is a source node (namely, a time server), a level corresponding to the target parameter when the time server is in locked mode may be used as the reference level. Correspondingly, the target parameter carried in the first announce packet is inferior to the target parameter when the time server is in locked mode. The target parameter of the time server in locked mode may be defined by the PTP. For example, it is defined in the PTP that a value of the clockClass when the time server is in locked mode is 6, and the value of the clockClass carried in the first announce packet is a value greater than 6, for example, 248. In addition, when time synchronization of the time server is certain, the target parameter carried in the first announce packet is the target parameter when the time server is in locked mode.

Because the level corresponding to the target parameter is lower than the reference level, when selecting a clock source, a first node is less likely to select a clock source corresponding to a port on which the first announce packet is received.

It should be noted that, if standards are different, reference levels corresponding to target parameters of the second node during time synchronization are different, and values of the target parameters are different when the reference levels are different. The reference levels of various nodes are usually the same. In a case in which the reference levels of the nodes may be different, the level corresponding to the target parameter carried in the first announce packet by the second node may be lower than a minimum value of the reference levels of all types of nodes. For example, for the target parameter clockClass, in the 1588v2, G.8275.1, and G.8275.2 protocol standards, when the clockClass is the reference level, the value of the clockClass is 6. In the G8265.1 protocol standard, when the clockClass is the reference level, the value of the clockClass is 84.

For example, in the 1588v2 protocol standard, when the clockClass is the reference level, the value of the clockClass is 6. If time synchronization of the second node is uncertain, the value of the clockClass may be set to 187 or 248, and a level corresponding to the value of 187 or 248 of the clockClass is lower than a level corresponding to the value of 6 of the clockClass, and is also lower than a level corresponding to the value of 84 of the clockclass. In this case, if a level of a target parameter in a first announce packet sent by another node which time is synchronized is higher than the level of the target parameter in the first announce packet sent by the second node, the first node does not select the clock source corresponding to the port on which the first announce packet is received.

In addition, a master clock identity included in the first announce packet may also be clock identity (clockIdentity) in a default dataset of the second node.

In an example embodiment, manners in which the second node generates the first announce packet based on the second announce packet include but are not limited to the following manners.

Manner 1: The level of the target parameter in the second announce packet is modified to obtain the first announce packet. During modification, the target parameter in the second announce packet is modified to a parameter whose level is lower than the level of the target parameter. For example, if the value of the clockClass in the second announce packet is 6, the value of the clockClass is modified to a value greater than 6, for example, 248.

In this manner, the second node serves as an intermediate node and receives the second announce packet sent by the upstream node. If time of the upstream node is synchronized, the level of the target parameter in the second announce packet is a reference level of the upstream node. Different nodes may have different reference levels. When time synchronization of the second node is uncertain, the second node modifies the level of the target parameter in the second announce packet, for example, degrades the target parameter in the second announce packet, to obtain the first announce packet carrying a degraded target parameter. If the reference levels of the nodes are the same, the level corresponding to the degraded target parameter carried in the first announce packet is lower than the reference level of the second node. If the reference levels of the nodes are different, the level corresponding to the degraded target parameter carried in the first announce packet is lower than a minimum value of the reference levels of all types of nodes.

It should be noted that, because a source port and a destination port corresponding to the second announce packet are different from a source port and a destination port corresponding to the first announce packet, in the process of modifying the second announce packet to obtain the first announce packet, in addition to degrading the target parameter, addresses of the source port and the destination port in the second announce packet need to be modified.

Manner 2: The first announce packet is generated based on information in the second announce packet. During generation of the first announce packet, a parameter whose level is lower than the target parameter in the second announce packet is padded into a corresponding field of the first announce packet. For example, the value of the clockClass in the second announce packet is 6, and a value greater than 6 (for example, 248) is padded into in the clockClass field of the first announce packet.

In Manner 2, the second node serves as an intermediate node. After receiving the second announce packet, the second node parses the second announce packet to obtain the information in the second announce packet. Then, when time synchronization of the second node is uncertain, the second node generates the first announce packet based on a status of the second node and the information in the second announce packet. In other words, a difference between Manner 2 and Manner 1 lies in that, in Manner 2, a new announce packet, namely, the first announce packet, is directly generated rather than obtained by modifying the second announce packet.

In Implementation B, the target parameter carried in the first announce packet is a default clock parameter of the second node, for example, a parameter in the default dataset of the second node. The default clock parameter is a preset parameter.

It should be noted that, because a value in the default clock parameter is generally an inferior value, a level corresponding to the default clock parameter of the second node is generally lower than the reference level in Implementation A.

In addition, the master clock identity included in the first announce packet may also be the clock identity (clockIdentity) in the default dataset of the second node.

For a manner in which the second node generates the first announce packet based on the second announce packet, refer to the foregoing Manner 1 and Manner 2, and details are not described again.

It should be noted that, in the foregoing Manner 1 and Manner 2, an example in which the second node is an intermediate node is used. For a case in which the second node is a node that first initiates the announce packet (namely, the source node) in a network, and is not an intermediate node, when time synchronization of the second node is uncertain, the second node may directly generate the first announce packet based on the status of the second node.

802: The second node sends the first announce packet to the first node, where a parameter carried in the first announce packet is used to select a clock source.

After the second node sends the first announce packet to the first node, the first node parses the first announce packet. If the reference levels of the nodes are the same, the level corresponding to the degraded target parameter carried in the first announce packet is lower than the reference level of the second node. If the reference levels of the nodes are different, the level corresponding to the degraded target parameter carried in the first announce packet is lower than the minimum value of the reference levels of all types of nodes. Therefore, when selecting a clock source, the first node does not select the clock source corresponding to the port on which the first announce packet is received.

According to the method in this embodiment of this application, when time synchronization of the upstream second node is uncertain, the first announce packet carries a target parameter whose level is lower than the reference level. In this way, when the downstream first node selects a clock source, because the level of the target parameter in the first announce packet is low, the clock source corresponding to the port on which the first announce packet is received is not selected, to avoid a time jump of the entire network due to a time jump of a downstream node caused by a fact that time synchronization of an upstream node is uncertain, and ensure normal running of a service.

It should be noted that, in the embodiment shown in FIG. 8, the following example is merely used for description. When time synchronization of the second node is uncertain, the first node does not select the clock source corresponding to the port on which the first announce packet is received, to avoid a time jump. If the time of the second node is synchronized subsequently, the level of the target parameter in the announce packet sent to the first node may be the reference level of the second node, so that the first node uses the clock source corresponding to the port on which the first announce packet is received as a selection object to select a clock source.

Figure 9:
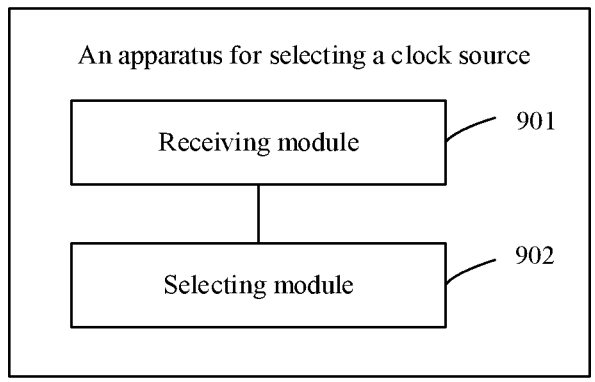
FIG. 9 is a schematic structural diagram of an apparatus for selecting a clock source according to an embodiment of this application.

An embodiment of this application provides an apparatus for selecting a clock source. The apparatus is applied to a first node. Referring to FIG. 9, the apparatus includes a receiving module 901 configured to receive, on a first port of the first node, a first packet sent by a second node, and a selection module 902 configured to, when the first packet carries a first flag, do not select, when the first node selects a clock source, a clock source corresponding to the first port, where the first flag is used to indicate that time synchronization of the second node is uncertain.

In an example embodiment, the selection module 902 is configured to do not use, when selecting a clock source, clock source data received on the first port to select the clock source.

In an example embodiment, the selection module 902 is configured to set, based on the first flag, a clock source dataset corresponding to the first port to an empty set, and select a clock source based on clock source datasets corresponding to ports of the first node, or select a clock source based on a non-empty clock source dataset in clock source datasets corresponding to ports of the first node.

In an example embodiment, the selection module 902 is configured to set a value of a signal failure attribute of the first port to a first value based on the first flag, where the first value is used to indicate that a signal failure occurs on the first port, and set, based on the first value of the signal failure attribute, the clock source dataset corresponding to the first port to an empty set.

In an example embodiment, the signal failure attribute of the first port is a portDS.SF, and the first value of the portDS.SF is true TRUE.

In an example embodiment, the selection module 902 is configured to determine, based on the first flag, that a PTSF event occurs on the first port, and set a value of the portDS.SF of the first port to the first value based on the PTSF event.

In an example embodiment, the PTSF event is a PTSF-lossSync event, a PTSF-unusable event, or an extended PTSF event.

In an example embodiment, the first packet is an announce packet.

In an example embodiment, a synchronizationUncertain flag in the announce packet is used to carry the first flag. When a value of the synchronizationUncertain is a third value, the first flag is used to indicate that time synchronization of the second node is uncertain.

In an example embodiment, the third value of the synchronizationUncertain is TRUE.

Figure 10:
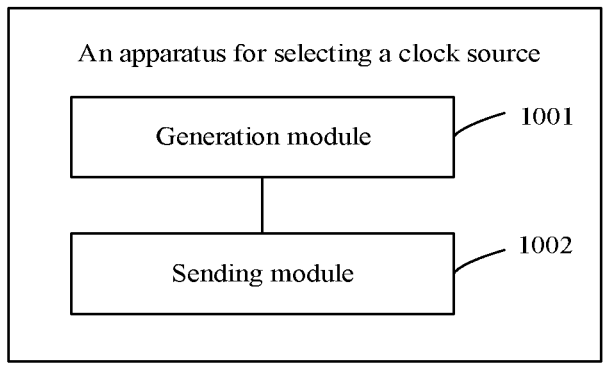
FIG. 10 is a schematic structural diagram of an apparatus for selecting a clock source according to an embodiment of this application.

An embodiment of this application provides an apparatus for selecting a clock source. The apparatus is applied to a second node. Referring to FIG. 10, the apparatus includes a generation module 1001 configured to generate a first announce packet, and a sending module 1002 configured to send the first announce packet to a first node, where a parameter carried in the first announce packet is used to select a clock source.

Specific implementations of the generation module 1001 include the following Implementation X and Implementation Y, which respectively correspond to Implementation A and Implementation B in the method embodiment shown in FIG. 8.

Implementation X: When time synchronization of the second node is uncertain, a level corresponding to a target parameter carried in the first announce packet generated by the generation module 1001 is lower than a reference level, and the reference level is a level corresponding to the target parameter when the second node performs time synchronization.

In an example embodiment, the target parameter is one or more of the following parameters: clockClass, clockAccuracy, and offsetScaledLogVariance.

When the second node is an intermediate node, in an example embodiment, the generation module 1001 is configured to receive a second announce packet sent by an upstream node, and generate the first announce packet based on the second announce packet. In this implementation, the target parameter carried in the first announce packet is inferior to a target parameter carried in the second announce packet (that is, a level of the target parameter carried in the second announce packet is used as the reference level). During generation of the first announce packet, the level of the target parameter in the second announce packet may be modified to obtain the first announce packet, or the first announce packet is generated based on information in the second announce packet.

When the second node is a time server, the target parameter carried in the first announce packet is inferior to a target parameter when the time server is in locked mode (that is, a level of the target parameter when the time server is in locked mode is used as the reference level).

Implementation Y: When time synchronization of the second node is uncertain, the target parameter carried in the first announce packet generated by the generation module 1001 is a default clock parameter of the second node, for example, a parameter in a default dataset of the second node.

It should be understood that, when the apparatuses provided in FIG. 9 and FIG. 10 implement functions of the apparatuses, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatus provided in the foregoing embodiment and the method embodiment are provided based on a same concept.

For a specific implementation process of the apparatus, refer to the method embodiment. Details are not described herein again.

An embodiment of this application provides a system for implementing clock source selection, where the system includes a first node and a second node.

The second node is configured to send a first packet to a first port of the first node.

The first node is configured to receive, on the first port of the first node, the first packet sent by the second node. When the first packet carries a first flag, do not select a clock source corresponding to the first port when the first node selects a clock source. The first flag is used to indicate that time synchronization of the second node is uncertain.

In an example embodiment, the first node is configured to do not use, when selecting a clock source, clock source data received on the first port to select the clock source.

In an example embodiment, the first node is configured to set, based on the first flag, a clock source dataset corresponding to the first port to an empty set, and select a clock source based on clock source datasets corresponding to ports of the first node, or select a clock source based on a non-empty clock source dataset in clock source datasets corresponding to ports of the first node.

In an example embodiment, the first node is configured to set a value of a signal failure attribute of the first port to a first value based on the first flag, where the first value is used to indicate that a signal failure occurs on the first port, and set, based on the first value of the signal failure attribute, the clock source dataset corresponding to the first port to an empty set.

In an example embodiment, the signal failure attribute of the first port is a portDS.SF, and the first value of the portDS.SF is true TRUE.

In an example embodiment, the first node is configured to determine, based on the first flag, that a PTSF event occurs on the first port, and set a value of the portDS.SF of the first port to the first value based on the PTSF event.

In an example embodiment, the PTSF event is a PTSF-lossSync event, a PTSF-unusable event, or an extended PTSF event.

In an example embodiment, the first packet is an announce packet.

In an example embodiment, a synchronizationUncertain flag in the announce packet is used to carry the first flag. When a value of the synchronizationUncertain is a third value, the first flag is used to indicate that time synchronization of the second node is uncertain.

In an example embodiment, the third value of the synchronizationUncertain is TRUE.

It should be understood that the foregoing system and the method embodiment in FIG. 2 are provided based on a same concept. For a specific implementation process of the system, refer to the method embodiment. Details are not described herein again.

An embodiment of this application provides a system for implementing clock source selection, where the system includes a first node and a second node.

The second node is configured to generate a first announce packet, and send the first announce packet to the first node.

The first node is configured to receive the first announce packet sent by the second node, where a parameter carried in the first announce packet is used to select a clock source.

As described in Implementation A in the method embodiment shown in FIG. 8, when time synchronization of the second node is uncertain, a level corresponding to a target parameter carried in the first announce packet is lower than a reference level, where the reference level is a level corresponding to the target parameter when the second node performs time synchronization.

In an example embodiment, the target parameter is one or more of the following parameters: clockClass, clockAccuracy, and offsetScaledLogVariance.

In an example embodiment, the second node is configured to receive a second announce packet sent by an upstream node, and generate the first announce packet based on the second announce packet. In this implementation, the target parameter carried in the first announce packet is inferior to a target parameter carried in the second announce packet (that is, a level of the target parameter carried in the second announce packet is used as the reference level). During generation of the first announce packet, the level of the target parameter in the second announce packet may be modified to obtain the first announce packet, or the first announce packet is generated based on information in the second announce packet.

When the second node is a time server, the target parameter carried in the first announce packet is inferior to a target parameter when the time server is in locked mode (that is, a level of the target parameter when the time server is in locked mode is used as the reference level).

As described in Implementation B in the method embodiment shown in FIG. 8, when time synchronization of the second node is uncertain, the target parameter carried in the first announce packet is a default clock parameter of the second node, for example, a parameter in a default dataset of the second node.

It should be understood that the foregoing system and the method embodiment in FIG. 8 are provided based on a same concept. For a specific implementation process of the system, refer to the method embodiment. Details are not described herein again.

Figure 11:
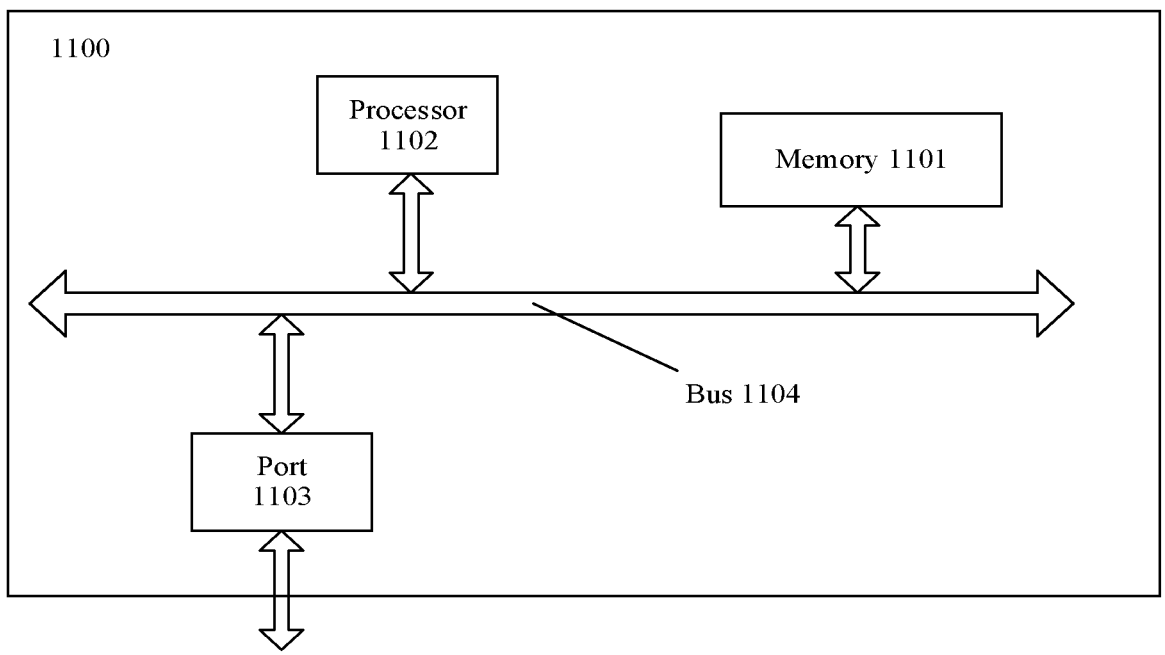
FIG. 11 is a schematic structural diagram of a device for selecting a clock source according to an embodiment of this application.

Referring to FIG. 11, an embodiment of this application further provides a device 1100 for selecting a clock source. The device 1100 for selecting a clock source shown in FIG. 11 is configured to perform operations related to the foregoing method for selecting a clock source. The device 1100 for selecting a clock source selection includes a processor 1102 and a port 1103, where the processor 1102 and the port 1103 are connected through a bus 1104.

The port 1103 is configured to communicate with another device in a network. The port 1103 may be implemented in a wireless or wired manner. The processor 1102 is configured to implement any one of the foregoing methods for selecting a clock source.

In an example embodiment, the device 1100 for selecting a clock source further includes a memory 1101. The memory 1101 stores at least one instruction, and the at least one instruction is loaded and executed by the processor 1102. The memory 1101, the processor 1102, and the port 1103 are connected through the bus 1104.

It should be understood that FIG. 11 shows only a simplified design of the device 1100 for selecting a clock source. During actual application, the device for selecting a clock source may include any quantity of interfaces, processors, or memories. In addition, the processor may be a central processing unit (CPU), or may be another general purpose processor, a digital signal processor (DSP), an application-specific integrated circuit (ASIC), a field-programmable gate array (FPGA), or another programmable logic device, a discrete gate or transistor logic device, a discrete hardware component, or the like. The general purpose processor may be a microprocessor, any conventional processor or the like. It should be noted that the processor may be a processor that supports an Advanced reduced instruction set computing (RISC) Machine (ARM) architecture.

Further, in an optional embodiment, the memory may include a ROM and a random-access memory (RAM), and provide an instruction and data to the processor. The memory may further include a non-volatile RAM. For example, the memory may further store information of a device type.

The memory may be a volatile memory or a nonvolatile memory, or may include both a volatile memory and a nonvolatile memory. The nonvolatile memory may be a ROM, a programmable ROM (PROM), an erasable PROM (EPROM), an electrically EPROM (EEPROM), or a flash memory. The volatile memory may be a RAM, and is used as an external cache. For example but not limitation, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

A computer-readable storage medium is further provided. The storage medium stores at least one instruction, and the instruction is loaded and executed by a processor to implement any one of the foregoing methods for selecting a clock source.

This application provides computer programs. When the computer programs are executed by a computer, a processor or the computer may be enabled to perform corresponding operations and/or procedures in the foregoing method embodiments.

All or some of the foregoing embodiments may be implemented by using software, hardware, firmware, or any combination thereof in the foregoing embodiments. When the embodiments are implemented by using software, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state drive).

The foregoing descriptions are merely the embodiments of this application, but are not intended to limit this application. Any modification, equivalent replacement, improvement, or the like made without departing from the spirit and principle of this application should fall within the protection scope of this application.

What is claimed is:

1. A method, comprising:
receiving, on a first port of a first node, a first packet from a second node, wherein the first packet carries a first flag indicating that a time synchronization of the second node is uncertain, and wherein the time synchronization of the second node is uncertain is associated with either a second port of the second node being in an uncalibrated state or a time difference between time of the second node and time of a first clock source of the second node being greater than a threshold; and
avoiding selecting, in response to the first packet carrying the first flag, a second clock source corresponding to the first port when selecting a third clock source of the first node.

2. The method of claim 1, further comprising:
receiving, on the first port, clock source data; and
avoiding using, when selecting the third clock source, the clock source data.

3. The method of claim 2, further comprising:
setting, based on the first flag, a first clock source dataset corresponding to the first port to an empty set; and
selecting, based on second clock source datasets corresponding to ports of the first node or only based on a non-empty clock source dataset in the second clock source datasets, the third clock source.

4. The method of claim 3, further comprising:
setting, based on the first flag, a value of a signal failure attribute of the first port to a first value, wherein the first value indicates that a signal failure has occurred on the first port; and
further setting, based on the first value, the first clock source dataset to the empty set.

5. The method of claim 4, wherein the signal failure attribute is a port signal fail attribute (portDS.SF), and wherein the first value of the portDS.SF is TRUE.

6. The method of claim 5, further comprising:
determining, based on the first flag, that a packet timing signal fail (PTSF) event has occurred on the first port; and
setting, based on the PTSF event, a value of the portDS.SF to the first value.

7. The method of claim 6, wherein the PTSF event is a PTSF-loss synchronization (PTSF-lossSync) event, a PTSF-unusable event, or an extended PTSF event.

8. The method of claim 1, wherein the first packet is an announce packet comprises a synchronizationUncertain flag.

9. The method of claim 8, wherein the synchronizationUncertain flag carries the first flag, and wherein the first flag indicates that the time synchronization is uncertain when a value of the synchronizationUncertain flag is TRUE.

10. The method of claim 1, wherein the time synchronization of the second node is uncertain is associated with: the second port of the second node is in the uncalibrated state.

11. The method of claim 1, further comprising selecting the third clock source of the first node.

12. A first node comprising:
a first port;
one or more processors; and
one or more memories configured to store instructions, wherein when executed by the one or more processors, the instructions cause the first node to:
receive, on the first port, a first packet from a second node, wherein the first packet carries a first flag indicates that a time synchronization of the second node is uncertain, and wherein the time synchronization of the second node is uncertain is associated with either a second port of the second node being in an uncalibrated state or a time difference between time of the second node and time of a first clock source of the second node being greater than a threshold; and
avoid selecting, in response to the first packet carrying the first flag, a second clock source corresponding to the first port when selecting a third clock source of the first node.

13. The first node of claim 12, wherein when executed by the one or more processors, the instructions further cause the first node to:
receive, on the first port, clock source data; and
avoid using, when selecting the third clock source, the clock source data.

14. The first node of claim 13, wherein when executed by the one or more processors, the instructions further cause the first node to:
set, based on the first flag, a first clock source dataset corresponding to the first port to an empty set; and
select, based on second clock source datasets corresponding to ports of the first node or only based on a non-empty clock source dataset in the second clock source datasets, the third clock source.

15. The first node of claim 14, wherein when executed by the one or more processors, the instructions further cause the first node to:
set, based on the first flag, a value of a signal failure attribute of the first port to a first value, wherein the first value indicates that a signal failure occurs on the first port; and
further set, based on the first value, the first clock source dataset to the empty set.

16. The first node of claim 15, wherein when executed by the one or more processors, the instructions further cause the first node to:
determine, based on the first flag, that a packet timing signal fail (PTSF) event occurs on the first port; and
set, based on the PTSF event, a value of a port signal failure attribute (portDS.SF) of the first port to TRUE.

17. The first node of claim 16, wherein the PTSF event is a PTSF-loss synchronization (PTSF-lossSync) event, a PTSF-unusable event, or an extended PTSF event.

18. The first node of claim 12, wherein the first packet is an announce packet comprises a synchronizationUncertain flag, wherein the synchronizationUncertain flag carries the first flag, and wherein the first flag indicates that the time synchronization is uncertain when a value of the synchronizationUncertain flag is TRUE.

19. The first node of claim 12, wherein the first flag is set to TRUE when: the second port of the second node is in the uncalibrated state.

20. The first node of claim 12, wherein the one or more processors are further configured to execute the instructions to select the third clock source of the first node.

21. A system, comprising:
a second node configured to send a first packet; and
a first node coupled to the second node and configured to:
receive, on a first port of the first node, the first packet from the second node, wherein the first packet carries a first flag indicating that a time synchronization of the second node is uncertain, and wherein the time synchronization of the second node is uncertain is associated with either a second port of the second node being in an uncalibrated state or a time difference between time of the second node and time of a first clock source of the second node being greater than a threshold; and avoid selecting, in response to the first packet carrying the first flag, a second clock source corresponding to the first port when selecting a third clock source of the first node.

22. The system of claim 21, wherein the first packet is an announce packet comprises a synchronizationUncertain flag, wherein the synchronizationUncertain flag carries the first flag, and wherein the first flag indicates that the time synchronization is uncertain when a value of the synchronizationUncertain flag is TRUE.

* * * * *